United States Patent [19]
Smashey et al.

[11] Patent Number: 5,897,801
[45] Date of Patent: Apr. 27, 1999

[54] WELDING OF NICKEL-BASE SUPERALLOYS HAVING A NIL-DUCTILITY RANGE

[75] Inventors: Russell W. Smashey, Loveland; Thomas J. Kelly, Cincinnati; John H. Snyder, Fairfield; Ronald L. Sheranko, Cincinnati, all of Ohio

[73] Assignee: General Electric Company, Cincinnati, Ohio

[21] Appl. No.: 08/787,356

[22] Filed: Jan. 22, 1997

[51] Int. Cl.$^6$ .................................................. B23K 9/04
[52] U.S. Cl. ................ 219/137 WM; 148/524; 219/76.15; 228/119
[58] Field of Search .................. 219/121.14, 121.13, 219/121.38, 121.46, 121.64, 129, 137 WM, 76.15, 76.14; 148/524, 525, 527; 228/119

[56] References Cited

U.S. PATENT DOCUMENTS

| | | | |
|---|---|---|---|
| 2,184,534 | 12/1939 | Smith et al. | 219/10 |
| 3,997,374 | 12/1976 | Dill et al. | |
| 4,176,433 | 12/1979 | Lee et al. | 148/527 |
| 4,285,459 | 8/1981 | Baladjanian et al. | 228/119 |
| 4,611,744 | 9/1986 | Fraser et al. | 228/119 |
| 4,655,383 | 4/1987 | Fournes et al. | 228/119 |
| 4,737,200 | 4/1988 | Herchenroeder et al. | 148/410 |
| 4,903,888 | 2/1990 | Clark et al. | 228/119 |
| 4,981,644 | 1/1991 | Chang | 420/442 |
| 5,060,842 | 10/1991 | Qureshi et al. | 228/119 |
| 5,071,054 | 12/1991 | Dzugan et al. | 228/119 |
| 5,083,002 | 1/1992 | Hoback et al. | 219/74 |
| 5,106,010 | 4/1992 | Stueber et al. | 228/232 |
| 5,170,027 | 12/1992 | Brodersen | 219/72 |
| 5,319,179 | 6/1994 | Joecks et al. | 219/137 |
| 5,374,319 | 12/1994 | Stueber et al. | 148/404 |
| 5,509,980 | 4/1996 | Lim | 148/525 |
| 5,554,837 | 9/1996 | Goldwater et al. | 219/121.64 |

*Primary Examiner*—Clifford C. Shaw
*Attorney, Agent, or Firm*—Andrew C. Hess; David L. Narciso

[57] ABSTRACT

An article made of a nickel-base superalloy having a nil-ductility range from the solidus temperature of the alloy to about 600° F. below the solidus temperature is welded, as for example in the weld repair of surface cracks, by removing foreign matter from the area to be welded, first stress relieving the article, adjusting the temperature of the article to a welding temperature of from about 1800° F. to about 2100° F., welding a preselected area in an inert atmosphere at the welding temperature, and second stress relieving the article. Welding is preferably accomplished by striking an arc in the preselected area so as to locally melt the alloy in the preselected area, providing a filler metal having the same composition as the nickel-based superalloy of the article, and feeding the filler metal into the arc so that the filler metal is melted and fused with the article to form a weldment upon solidification.

17 Claims, 3 Drawing Sheets

WELDING OF NICKEL-BASE SUPERALLOYS HAVING A NIL-DUCTILITY RANGE

The invention herein described was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to welding, and, more particularly, to the welding of nickel-base superalloys having limited ductility at elevated temperature.

Nickel-base superalloys are alloys containing about 50 percent or more by weight of nickel, plus alloying elements that are added to improve the mechanical and physical properties of the alloy. These materials are used in aircraft gas turbine components and other applications which require good strength, creep resistance, fracture toughness, and other mechanical properties at elevated temperatures such as 1500° F. and higher for extended periods of time. For example, high-pressure turbine blades and vanes in aircraft gas turbine engines, as well as structural elements exposed to high temperatures for prolonged periods during service, are commonly made of nickel-base superalloys.

The selection of the types and amounts of alloying elements present in the alloy, in combination with the thermal processing, determines to a large degree the properties of the alloy. In some cases, the nickel-base superalloy is moderately strong and moderately ductile, even at high temperatures. In other cases, the combination of alloying elements causes the material to be very strong but of limited ductility even at temperatures approaching the melting point, a temperature at which many alloys become highly ductile.

In one class of nickel-base superalloy of interest here, the alloy has very small, substantially no (nil), ductility in the temperature range between the solidus (freezing) temperature of the alloy and a temperature about 600° F. below the solidus temperature. This behavior plays a significant role in the properties of the alloy, because as the alloy is cooled through this range, or is processed or operated while in this range, the material is highly susceptible to the formation of cracks and other defects which remain in the structure upon cooling to room temperature and during service. Such cracks can also form later in the processing, as for example during welding and post-weld heat treatments. Examples of such nickel-base superalloys having a "nil-ductility range" are Rene 108 and Mar-M247.

Articles made of nickel-base superalloys are usually cast from the melt into a mold, with investment casting being the most popular approach, and then further processed. The as-cast articles sometimes have surface crack defects such as hot tears and surface-connected porosity due to shrinkage defects, which problems are acute for the alloys having a nil-ductility range. These surface defects are deleterious to the properties of the article, either directly or by preventing the closure of interior porosity and shrinkage cavities during subsequent processing.

If the surface defects are not too severe, as is often the case, they may be repaired. However, existing repair techniques involving welding procedures are not fully successful in removing the surface defects, particularly for the nickel-base superalloys with a nil-ductility range. It is often the case that the repair procedure itself leads to even further defects, which in turn must be repaired. The procedures are accordingly very labor intensive, time consuming, and expensive. They also result in products which may have reduced properties at the location of the repair.

There is accordingly a need for an improved technique for repairing surface defects in articles made of nickel-base superalloys having a nil-ductility range at elevated temperature. The present invention fulfills this need, and further provides related advantages.

SUMMARY OF THE INVENTION

The present invention provides a welding technique for nickel-base superalloy articles of limited ductility near the solidus temperature. The approach may be used for weld repair of defects such as surface cracks on a single such article, or for joining of two such articles together. Care is taken in the welding procedure to avoid a material state where the existing defects propagate further into the structure and so that new defects are not formed. Strain-age cracking is thereby avoided or minimized.

In accordance with the invention, a method of welding a nickel-base superalloy having a nil-ductility range from the solidus temperature of the alloy to about 600° F. below the solidus temperature comprises the steps of furnishing an article made of a nickel-base superalloy having a nil-ductility range from the solidus temperature of the alloy to about 600° F. below the solidus temperature, and removing any foreign matter present in a preselected area of the article to be welded. Foreign matter is preferably removed by a combination of grinding away material around the preselected area and chemically cleaning the preselected area. The method further includes first heating the article at a first stress-relieving temperature in the nil-ductility range, adjusting the temperature of the article to a bulk-material welding temperature within the nil-ductility range, but less than the first-stress-relieving temperature, welding the preselected area of the article, in an inert atmosphere, at the welding temperature, and second heating the article from the welding temperature to a second stress relieving temperature in the nil-ductility range, but above the welding temperature. The steps of first heating, adjusting, welding, and second heating are accomplished without reducing the temperature of the preselected area to substantially less than the bulk temperature of the article. No hot isostatic pressing is required in this processing.

The nickel-base superalloy is one having a nil-ductility range, such as R108 or Mar M-247. For such alloys, the preferred first heating temperature is from about 2000° F. to about 2200° F., a temperature which stress relieves the alloy. The bulk-material welding temperature is preferably from about 1750° F. to about 2100° F. Welding is preferably performed by striking an arc in the preselected area so as to locally melt the alloy in the preselected area, providing a filler metal, and feeding the filler metal into the arc so that the filler metal is melted and fused with the article. Upon cooling, the filler metal forms a weldment. The second heating temperature is from about 2000° F. to about 2200° F. The steps of first heating, adjusting, welding, and second heating are preferably accomplished in a high-purity inert gas atmosphere to prevent reaction of the atmosphere with the alloying elements in the superalloy.

The present approach thus provides an approach for welding difficult to-weld nickel-based superalloys that have a nil-ductility range just below their solidus temperature. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 7 is an elevational view of two articles welded together by the approach of the invention.

DETAILED DESCRIPTION OF THE INVENTION

Figure 1:
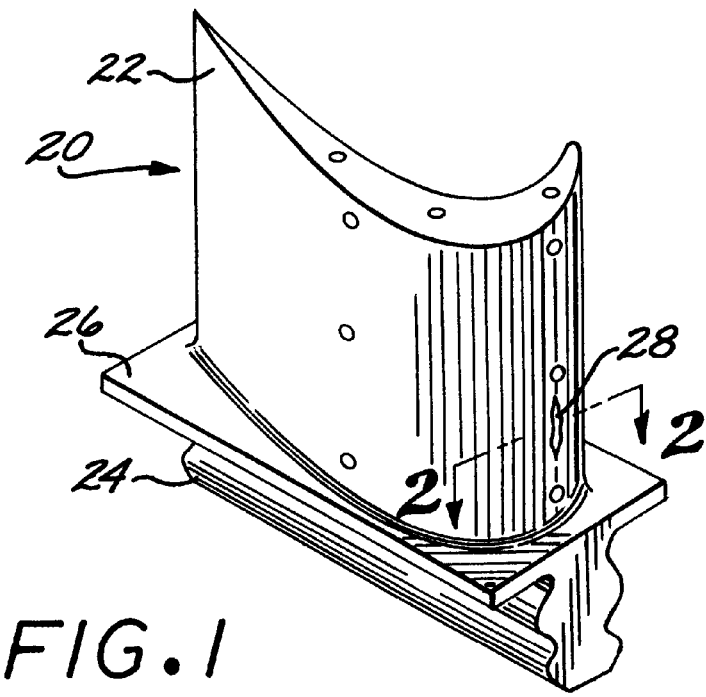
FIG. 1 is a perspective view of a gas turbine blade article.

FIG. 1 depicts an article that is a component of a gas turbine engine such as a turbine blade or turbine vane, and in this case a high-pressure turbine blade article 20, made of a nickel-base superalloy having a nil-ductility range from the solidus temperature of the alloy to about 600° F. below the solidus temperature. Other gas turbine components can benefit from the welding approach of the invention, such as, for example, structural castings. The turbine blade 20 includes an airfoil 22 against which the flow of hot exhaust gas is directed. The turbine blade 20 is mounted to a turbine disk (not shown) by a dovetail 24 which extends downwardly from the airfoil 22 and engages a slot on the turbine disk. A platform 26 extends longitudinally outwardly from the area where the airfoil 22 is joined to the dovetail 24.

The present invention applies to nickel-base superalloy having a nil-ductility range from the solidus temperature of the alloy to about 600° F. below the solidus temperature. Such alloys are at least about 50 percent by weight nickel with a high alloying content that results in the low ductility near the solidus temperature. The "nil-ductility" range means that the alloy has a low ductility in tensile testing in this temperature range, on the order of 1 percent or less. Examples of operable nickel-base superalloys within this definition include the following alloys, whose nominal compositions are stated in weight percent: R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.01–0.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 8.25 percent copper, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 3.0 percent tantalum, balance nickel and incidental impurities; Mar M-200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium, 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

According to conventional processing, the article such as the turbine blade 20 is cast from molten metal in a mold, typically an investment casting mold. The cast article is cooled to ambient temperature. As a result of the casting operation, an undesirable casting defect 28 is present at a surface 30 of the blade 20. (The present approach is applicable to other types of defects as well.)

Figure 2:
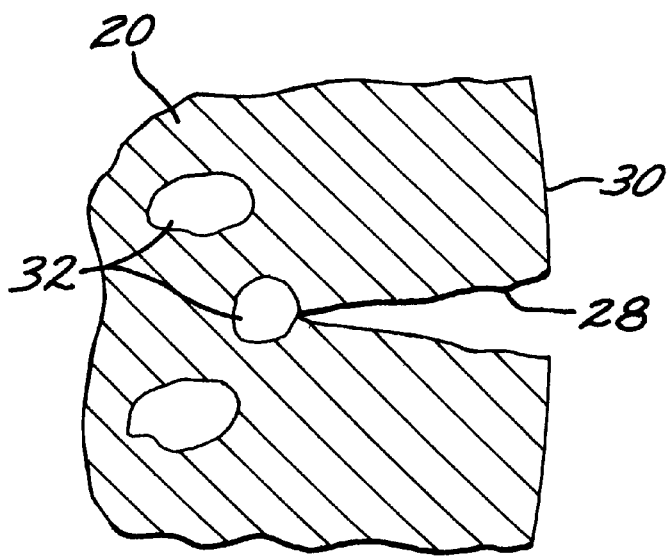
FIG. 2 is an enlarged sectional view through the article of FIG. 1, taken generally along line 2—2.

FIG. 2 illustrates the casting defect 28 in greater detail. In this case, the defect 28 is a large crack or opening extending inwardly toward the interior of the blade 20. Such an article also typically has interior porosity 32 resulting from the facts that the outer portion of the article solidifies first against the mold wall, and that the center portions of the article thereafter experience externally constrained shrinkage upon solidification that results in cavities and porosity. The interior porosity, or shrinkage cavity, may be entirely interior to the article or may be connected to the surface through the defect 28.

Figure 3:
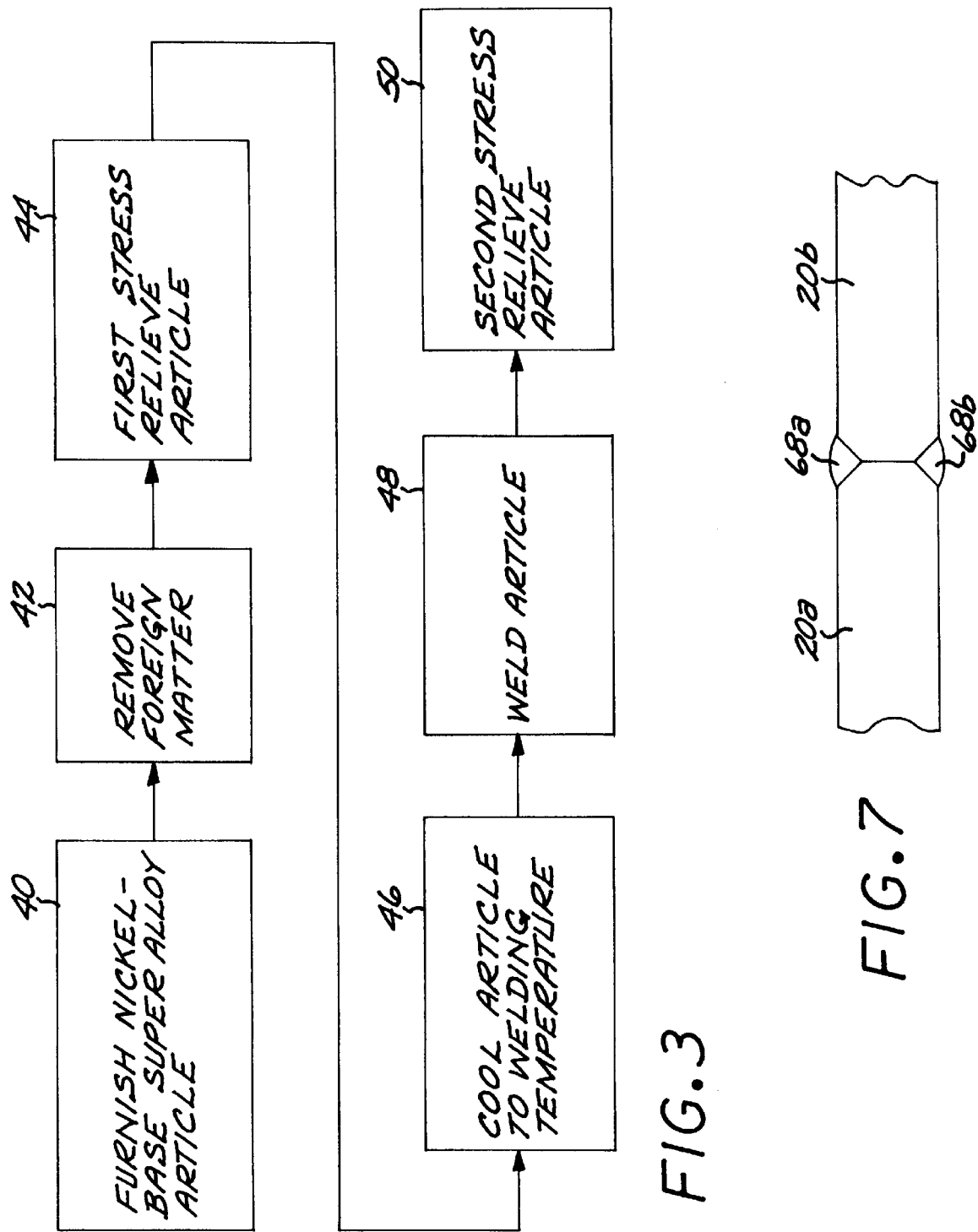
FIG. 3 is a block diagram of a process for repairing the article of FIG. 1, according to the invention.
Figure 4:
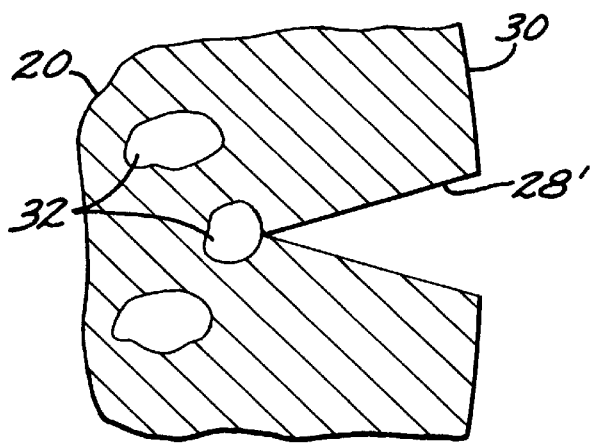
FIG. 4 is an enlarged sectional view like that of FIG. 2, after removing foreign matter.

FIG. 3 illustrates the approach of the invention, as applied to such an article. The article 20, made of the nickel-base superalloy, and with the defect 28 and the interior porosity 32 is provided, numeral 40. Any foreign matter is removed, numeral 42, from a preselected area of the article to be welded, in this case the region of the defect 28. The foreign matter is typically of three types. The foreign matter may be pieces of material of another composition, such as ceramic particles from the investment casting mold that have adhered to the inside surfaces of the defect 28. The foreign matter may also be a chemical contaminant or an oxide film. To remove the pieces of material of another composition, some of the material found at the surface of the area to be welded is removed, preferably by grinding as with a rotary grinder. In the case of the weld repair of the defect shown in FIG. 2, material inside the defect 28 is removed by grinding or other technique, enlarging the width of the defect as shown at groove 28' in FIG. 4. The groove 28' is preferably at least two times, or even three times, the width of the original defect 28, ensuring that particles of foreign matter are removed. To remove the chemical contaminants, the surfaces of the defect 28 (if no grinding is performed) or the groove 28' (if grinding is performed) are cleaned in a suitable cleaning agent. Preferably, for the nickel-base superalloy the cleaning is performed by ultrasonic cleaning in acetone for about 5 to 30 minutes, followed by air drying.

After the foreign matter is removed, the article is first stress relieved by heating to a suitable stress relieving temperature, numeral 44. The stress relieving temperature is preferably from about 2000° F. to about 2200° F. for 1 to 4 hours. The stress relieving is performed in the weld chamber in a high-purity atmosphere whose nature will be discussed subsequently.

After stress relieving, the article is cooled from the stress-relieving temperature to a bulk-material welding temperature, numeral 46. The bulk-material welding temperature is preferably from about 1750° F. to about 2100° F. For the most preferred Rene 108 alloy, the preferred bulk-metal welding temperature is about 1900° F. The term "bulk-metal welding temperature" refers to the fact that the entire article is heated to that temperature, and the local region being welded is heated even further. The welding is performed in the welding apparatus under an inert gas such as argon.

In the latter preferred case of welding under a high-purity inert argon gas, care is taken to maintain the oxygen content of the inert gas at less than about 1 part per million (ppm), because residual oxygen strongly oxidizes alloying elements in the nickel-base superalloy, to reduce the weld quality. For the same reason, the moisture content of the inert gas is maintained very low, with a dew point of the inert gas of less than about −80° F. The oxygen and moisture contents may be maintained at these low levels by passing the inert gas through a nickel-train gas purifier operated at 1600° F. before it enters the welding chamber, and continuously monitoring the oxygen content of the inert gas.

The welding chamber is preferably a glove box operating at one atmosphere of the inert gas processed as just described to achieve high purity. The interior of the glove box is preheated prior to the start of welding to outgas oxygen, moisture, and other residual gases.

Figure 5:
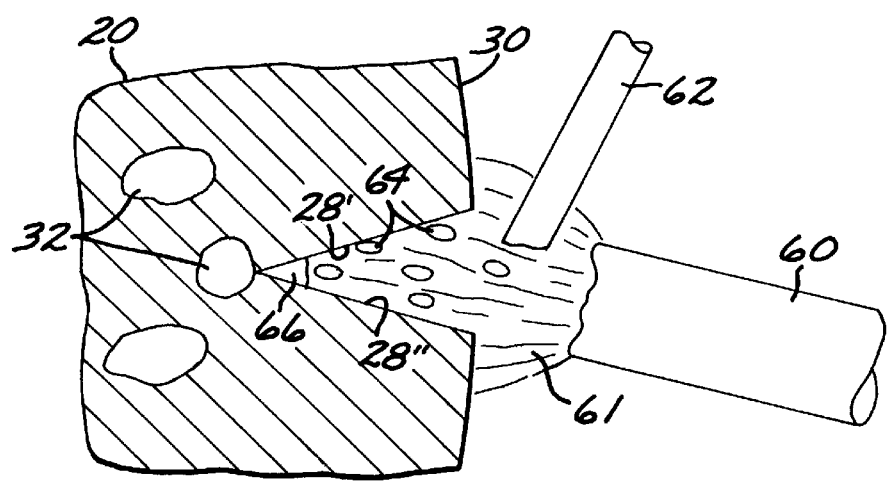
FIG. 5 is an enlarged sectional view like that of FIGS. 2 and 4, during welding.

The welding process is performed, numeral 48. FIG. 5 illustrates a preferred approach. A tungsten electrode 60 is positioned adjacent to the region to be welded, here the groove 28'. An electrical current is passed between the electrode 60 and the article 20 to form an arc 61, with the highest current density passing through the area of the groove 28'. The current is adjusted so that the sides of the groove 28' become molten, as indicated at numeral 28". The objective is to locally melt the nickel-base superalloy of the article 20, just in the area to be welded, here the groove 28' earlier ground into the region of the defect 28. This objective is readily accomplished by skilled welders or by automated welding equipment.

Figure 6:
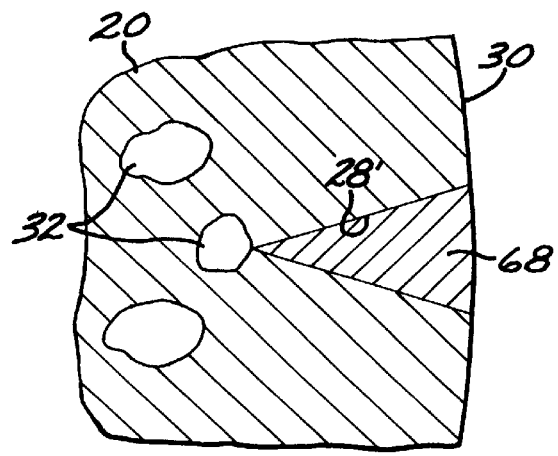
FIG. 6 is an enlarged sectional view like that of FIGS. 2, 4, and 5, after welding is complete.

At the same time, a filler metal is provided. Preferably, a weld rod 62 of filler metal is provided, having been previously cleaned by the chemical cleaning same procedure described in relation to step 42. The weld rod 62 is slowly fed and introduced into the arc 61, as shown in FIG. 5, so that droplets 64 of the filler metal are melted off the end of the rod 62 to form a filler pool 66 in the interior of the groove 28'. The filler metal 66 and the molten nickel-base superalloy 28" mix together. The electrode 60 and rod 62 are moved longitudinally along the length of the groove 28' (i.e., movement out of the plane of the drawing in FIG. 5), with the rate of movement selected so that a sufficient amount of filler metal is melted into the groove 28' to fill it. As the electrode 60 and rod 62 move, the melted material behind this welding material source cools and solidifies, leaving a weldinent 68 filling what was previously the groove 28', as shown in FIG. 6. The weldment 68 is strongly bonded to the groove region 28' of the article 20, because of the care taken to remove foreign matter, the care taken to maintain a high-purity welding atmosphere, and the intermixing and fusion of the filler metal and the base material of the article 20.

The filler metal of the weld rod 62 may be any suitable material. However, it is preferred that the filler metal be of the same composition as the nickel-base superalloy making up the article 20, so that there is a match of chemical and physical properties in the repaired region.

After the welding 48 is complete, the article 20, with the weldment 68 in place, is second stress relieved, numeral 50, by heating from the welding temperature to a second stress relieving temperature. The second stress relieving temperature is preferably from about 2000° F. to about 2200° F., for a time of about 1 hour. For the most preferred Rene 108 nickel-base superalloy, the second stress relieving temperature is about 2100° F. The stress relieving is performed in the same inert atmosphere as the welding. After stress relieving for an operable period of time, about 1 hour, the article is cooled from the stress-relieving temperature at a relatively slow rate of less than about 100° F. per hour to a temperature of less than about 1600° F., in order to minimize the re-introduction of internal residual stresses in the article. These numerical values are typical, inasmuch as the required cooling rate may be slower for large articles.

It is preferred that the steps 44, 46, 48, and 50 be conducted in a single apparatus, the welding apparatus, which has an oven with the capability to heat and cool as indicated. Performing these steps in a single apparatus avoids oxidation and possible contamination that could occur in moving the article from one apparatus to another. It is also preferred that these steps 44, 46, 48, and 50 be accomplished without reducing the temperature of the preselected area to substantially less than the bulk temperature of the article, to avoid the introduction of overly large strains and cracking prior to completion of the welding operation.

An advantage of the present approach is that no hot isostatic pressing is required to accomplish the welding.

Welding according to the present approach has been described in terms of weld repair of articles 20 with defects therein. However, as illustrated in FIG. 7, it may also be used to weld together two different articles 20a and 20b. The same steps as described previously are preferably used, resulting in weldments 68a and 68b.

Optionally, the article may be hot isostatically pressed to remove porosity either before or after the welding operation.

This invention has been described in connection with specific embodiments and examples. However, those skilled in the art will recognize various modifications and variations of which the present invention is capable without departing from its scope as represented by the appended claims.

What is claimed is:

1. A method of welding a nickel-base superalloy having a nilductility range from the solidus temperature of the alloy to about 600° F. below the solidus temperature, comprising the steps of furnishing an article made of a nickel-base superalloy having a nil-ductility range from the solidus temperature of the alloy to about 600° F. below the solidus temperature;

removing any foreign matter present in a welding area of the article to be welded;

first heating the article at a first stress-relieving temperature in the nil-ductility range;

adjusting the temperature of the article to a bulk-material welding temperature within the nil-ductility range, but less than the first-stress-relieving temperature;

welding the welding area of the article, in an inert atmosphere, at the welding temperature; and second heating the article from the welding temperature to a second stress relieving temperature in the nil-ductility range, but above the welding temperature, the steps of first heating, adjusting, welding, and second heating being accomplished without reducing the temperature of the welding area to substantially less than the bulk temperature of the article.

2. The method of claim 1, wherein the step of furnishing includes the step of furnishing a nickel base superalloy having a composition, in weight percent, selected from the group consisting of R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.01–0.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 8.25 percent copper, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 3.0 percent tantalum, balance nickel and incidental impurities; Mar M-200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium, 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

3. The method of claim 1, wherein the step of removing includes the step of removing foreign matter from the region of a crack in the article by grinding away material around the crack.

4. The method of claim 1, wherein the step of removing includes the step of removing foreign matter from the region of a crack in the article by grinding away material around the crack to a width of at least about 2 times the width of the crack.

5. The method of claim 1, wherein the step of removing includes the step of chemically cleaning the welding area.

6. The method of claim 1, wherein the step of first heating includes the step of heating the article to a temperature of from about 2000° F. to about 2200° F.

7. The method of claim 1, wherein the step of adjusting the temperature includes the step of adjusting the temperature to a welding temperature of from about 1800° F. to about 2100° F.

8. The method of claim 1, wherein the step of welding includes the step of striking an arc in the welding area so as to locally melt the alloy in the welding area.

9. The method of claim 1, wherein the step of welding includes the step of providing a filler metal having the same composition as the nickel-based superalloy of the article.

10. The method of claim 1, wherein the step of second heating includes the step of heating the article to a temperature of from about 2000° F. to about 2200° F.

11. The method of claim 1, wherein there is no step of hot isostatic pressing at any time in the processing.

12. A method of welding a nickel-base superalloy having a nil-ductility range from the solidus temperature of the alloy to about 600° F. below the solidus temperature, comprising the steps of furnishing an article made of a nickel-base superalloy having a nil-ductility range from the solidus temperature of the alloy to about 600° F. below the solidus temperature;

removing any foreign matter present in a welding area of the article to be welded;

first heating the article to a temperature of from about 2000° F. to about 2200° F.;

adjusting the temperature of the article to a bulk-material welding temperature of from about 1800° F. to about 2100° F.; and welding the welding area of the article, in an inert atmosphere, at the bulk-material welding temperature, the step of welding including the steps of striking an arc in the welding area so as to locally melt the alloy in the welding area, providing a filler metal, and feeding the filler metal into the arc so that the filler metal is melted and fused with the article; and second heating the article from the bulk-material welding temperature to a temperature of from about 2000° F. to about 2200° F., the steps of first heating, adjusting, welding, and second heating being accomplished without reducing the temperature of the welding area to substantially less than the bulk temperature of the article.

13. The method of claim 12, wherein the step of furnishing includes the step of furnishing a nickel base superalloy having a composition, in weight percent, selected from the group consisting of R108, having a nominal composition of 0.07–0.10 percent carbon, 8.0–8.7 percent chromium, 9.0–10.0 percent cobalt, 0.4–0.6 percent molybdenum, 9.3–9.7 percent tungsten, 2.5–3.3 percent tantalum, 0.6–0.9 percent titanium, 5.25–5.75 percent aluminum, 0.010.02 percent boron, 1.3–1.7 percent hafnium, 0.1 percent maximum manganese, 0.06 percent maximum silicon, 0.01 percent maximum phosphorus, 0.004 percent maximum sulfur, 0.005–0.02 percent zirconium, 0.1 percent maximum niobium, 0.1 percent maximum vanadium, 0.1 percent maximum copper, 0.2 percent maximum iron, 0.003 percent maximum magnesium, 0.002 percent maximum oxygen, 0.002 percent maximum nitrogen, balance nickel and incidental impurities; Mar M-246, having a nominal composition of 8.25 percent copper, 10.0 percent cobalt, 0.7 percent molybdenum, 10.0 percent tungsten, 1.0 percent titanium, 5.5 percent aluminum, 0.5 percent maximum iron, 0.15 percent carbon, 0.015 percent boron, 0.05 percent zirconium, 1.5 percent hafnium, 3.0 percent tantalum, balance nickel and incidental impurities; Mar M200, having a nominal composition of 0.15 percent carbon, 9 percent chromium, 10 percent cobalt, 1 percent iron, 5 percent aluminum, 0.015 percent boron, 2 percent titanium, 12.5 percent tungsten, 0.05 percent zirconium. 1 percent niobium, balance nickel and incidental impurities; AF2-1DA, having a nominal composition of 0.35 percent carbon, 12 percent chromium, 10 percent cobalt, 3 percent molybdenum, 0.5 percent maximum iron, 4.6 percent aluminum, 0.015 percent boron, 3 percent titanium, 6 percent tungsten, 0.1 percent zirconium, 1.5 percent tantalum, balance nickel and incidental impurities; Udimet 500, having a nominal composition of 0.1 percent carbon, 18 percent chromium, 17 percent cobalt, 4 percent molybdenum, 2 percent iron, 3 percent aluminum, 3 percent titanium, balance nickel and incidental impurities; B1900, having a nominal composition of 0.1 percent carbon, 8 percent chromium, 10 percent cobalt, 6 percent molybdenum, 6 percent aluminum, 0.015 percent boron, 1 percent titanium, 0.1 percent zirconium, 4 percent tantalum, balance nickel and incidental impurities; Inconel 100, having a nominal composition of 0.18 percent carbon, 9.5 percent chromium, 15 percent cobalt, 3 percent molybdenum, 5.5 percent aluminum, 0.015 percent boron, 4.2 percent titanium, 0.06 percent zirconium, 1 percent vanadium, balance nickel and incidental impurities; Udimet 700, having a nominal composition of 0.1 percent carbon, 15 percent chromium, 18.5 percent cobalt, 5.25 percent molybdenum, 4.25 percent aluminum, 0.03 percent boron, 3.5 percent titanium, balance nickel and incidental impurities; and Rene 80, having a nominal composition of 0.17 percent carbon, 14 percent chromium, 9.5 percent cobalt, 4 percent molybdenum, 3 percent aluminum, 0.015 percent boron, 5 percent titanium, 4 percent tungsten, 0.03 percent zirconium, balance nickel and incidental impurities.

14. The method of claim 12, wherein the step of providing includes the step of providing a filler metal having the same composition as the nickel-based superalloy of the article.

15. The method of claim 12, wherein the step of removing includes the step of removing foreign matter from the region of a crack in the article by grinding away material around the crack.

16. The method of claim 12, wherein the step of removing includes the step of removing foreign matter from the region of a crack in the article by grinding away material around the crack to a width of at least about 2 times the width of the crack.

17. The method of claim 12, wherein the step of removing includes the step of chemically cleaning the welding area.

* * * * *